United States Patent
Kim et al.

(10) Patent No.: US 10,170,778 B2
(45) Date of Patent: Jan. 1, 2019

(54) THERMAL MANAGEMENT SYSTEM OF FUEL CELL VEHICLE

(71) Applicant: HYUNDAI MOTOR COMPANY, Seoul (KR)

(72) Inventors: Hyung Kook Kim, Seongnam-si (KR); Sun Heum Baek, Hwaseong-si (KR); Sung Wook Na, Yongin-si (KR); Hunwoo Park, Namyangju-si (KR); Dae Jong Kim, Yongin-si (KR); Su Dong Han, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 239 days.

(21) Appl. No.: 15/209,087

(22) Filed: Jul. 13, 2016

(65) Prior Publication Data

US 2017/0062846 A1    Mar. 2, 2017

(30) Foreign Application Priority Data

Aug. 26, 2015   (KR) .......................... 10-2015-0120389

(51) Int. Cl.
- *H01M 8/04007* (2016.01)
- *B60L 11/18* (2006.01)
- *H01M 8/04029* (2016.01)
- *H01M 8/04044* (2016.01)
- *H01M 8/04701* (2016.01)
- *H01M 8/04746* (2016.01)

(52) U.S. Cl.
CPC ..... *H01M 8/04074* (2013.01); *B60L 11/1888* (2013.01); *H01M 8/04029* (2013.01); *H01M 8/04037* (2013.01); *H01M 8/04044* (2013.01); *H01M 8/04701* (2013.01); *H01M 8/04723* (2013.01); *H01M 8/04768* (2013.01); *B60L 2240/36* (2013.01); *H01M 2250/20* (2013.01); *Y02T 90/32* (2013.01)

(58) Field of Classification Search
CPC ......... H01M 8/04074; H01M 8/04701; H01M 8/04037; H01M 8/04768; H01M 8/04044; H01M 8/04029; H01M 8/04723; H01M 2250/20; B60L 11/1888; B60L 2240/36
See application file for complete search history.

(56) References Cited

U.S. PATENT DOCUMENTS

| | | | |
|---|---|---|---|
| 2010/0196775 A1* | 8/2010 | Wu | H01M 8/04029 429/438 |
| 2013/0295478 A1* | 11/2013 | Han | H01M 8/04417 429/428 |

FOREIGN PATENT DOCUMENTS

| | | |
|---|---|---|
| JP | 2006-120342 A | 5/2006 |
| JP | 2009-110684 A | 5/2009 |
| JP | 2013-191374 A | 9/2013 |
| KR | 10-0802749 B1 | 2/2008 |
| KR | 10-2008-0028719 A | 4/2008 |
| KR | 10-2010-0046730 A | 5/2010 |
| KR | 10-2015-0079375 A | 7/2015 |

* cited by examiner

*Primary Examiner* — Ula C Ruddock
*Assistant Examiner* — Matthew W Van Oudenaren
(74) *Attorney, Agent, or Firm* — McDermott Will & Emery LLP

(57) ABSTRACT

A thermal management system of a fuel cell vehicle includes a cold start loop which heats a coolant that flows through a fuel cell during a cold start of the fuel cell, and a cooling loop which moves a coolant that cools the fuel cell.

8 Claims, 10 Drawing Sheets

THERMAL MANAGEMENT SYSTEM OF FUEL CELL VEHICLE

CROSS-REFERENCE TO RELATED APPLICATION

This application claims the benefit of priority to Korean Patent Application No. 10-2015-0120389, filed with the Korean Intellectual Property Office on Aug. 26, 2015, the entire contents of which are incorporated herein by reference.

TECHNICAL FIELD

The present disclosure relates to a fuel cell vehicle, and more particularly, to a thermal management system (TMS) of a fuel cell vehicle.

BACKGROUND

A fuel cell vehicle, which is an environmentally-friendly vehicle, uses a fuel cell to facilitate chemical reactions between hydrogen and oxygen to produce an electricity supply and drive a motor using electricity generated by the fuel cell.

A fuel cell system for a fuel cell vehicle consists of a fuel cell stack for generating electrical energy, a fuel supply device for supplying a fuel (e.g., hydrogen) to the fuel cell stack, an air supply device for supplying oxygen in air that is an oxidant and is required for an electrochemical reaction, and a thermal management system (TMS) that removes reaction heat of the fuel cell stack from the system, controls operating temperature of the fuel cell stack, and performs water and thermal management functions.

The TMS, which is a cooling apparatus that circulates antifreeze or distilled water that acts as a coolant through the fuel cell stack to maintain a temperature (e.g., 60-70° C.), consists of a reservoir for storing the coolant, a pump for circulating the coolant, an ion filter for removing ions from the circulating coolant, and a radiator for lowering temperature of the coolant. The TMS can have a heating, ventilation, and air conditioning (HVAC) heater that performs a vehicle heating function.

The fuel cell system generates electricity by an electrochemical reaction between a fuel (e.g., hydrogen) and oxygen in air, and discharges heat and water that are reaction by-products.

The fuel cell system generates heat that is a reaction by-product, and thus should have a device for cooling the fuel cell stack in order to prevent a temperature rise in the stack. Also, a challenge in the fuel cell system is to ensure cold start ability, and thus the TMS can play an important role. To ensure a cold starting ability, a method for rapidly defrosting the coolant in the fuel cell stack or a method for using stack antifreeze as the coolant is used.

The coolant of the TMS acts as a refrigerant that cools the fuel cell stack. The coolant is rapidly heated by a heater during the cold start, and thus acts as a heating medium that heats the stack quickly.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a thermal management system of a fuel cell vehicle which is capable of shortening cold-start time of a fuel cell including a fuel cell stack, and may improve durability of the fuel cell.

An exemplary embodiment of the present disclosure may provide the thermal management system of the fuel cell vehicle, including: a cold start loop which cold-starts a fuel cell and heats a coolant that flows in the fuel cell; and a cooling loop which moves a coolant that cools the fuel cell.

The thermal management system of the fuel cell vehicle may further include a variable directional control valve which changes flow direction of the coolant in the cold start loop.

The cold start loop may include a pump which pumps a coolant that flows from the fuel cell, a deionizer which filters ions of a coolant that flows from the pump, and a heater which heats a coolant that flows from the deionizer.

The cooling loop may include a pump which pumps a coolant that flows from the fuel cell, and a radiator which cools a coolant flowing from the pump.

The cooling loop may further include a 3-way valve which selects between the coolant flowing from the pump and a coolant flowing from the radiator to provide the selected coolant to the fuel cell.

The thermal management system may further include a controller which controls operation of the variable directional control valve.

The variable directional control valve may include a first port which is connected to an inlet of the fuel cell, a second port which is connected to an outlet of the fuel cell, a third port which is connected to the heater, a fourth port which is connected to the pump, a first internal flow path which rotates to connect the first port and the third port or connect the second port and the third port, and a second internal flow path which rotates to connect the second port and the fourth port or connect the first port and the fourth port.

When the pump is driven, the coolant of the cold start loop may move from the fourth port to the third port through the deionizer and the heater, the coolant moved to the third port may move to the first port after the coolant moved to the third port passes through the first internal flow path, the coolant moved to the first port may move to the second port after the coolant moved to the first port moves in a first direction through a flow path included in the cooling loop to heat the fuel cell, and the coolant moved to the second port may move to the fourth port after the coolant moved to the second port passes through the second internal flow path.

After the coolant of the cold start loop moves to the fourth port, the first internal flow path and the second internal flow path may rotate so that a coolant flow of the cold start loop stops.

When the first internal flow path and the second internal flow path rotate and the pump is driven after the coolant flow of the cold start loop stops, the coolant of the cold start loop may move from the fourth port to the third port through the deionizer and the heater, the coolant moved to the third port may move to the second port after the coolant moved to the third port passes through the first internal flow path, the coolant moved to the second port may move to the first port after the coolant moved to the second port moves in a second direction through the flow path included in the cooling loop to heat the fuel cell, and the coolant moved to the first port may move to the fourth port after the coolant moved to the first port passes through the second internal flow path.

Flow amount of the coolant in the cold start loop may be small.

The thermal management system of the fuel cell vehicle according to the exemplary embodiment of the present disclosure may use flow oscillation of the coolant having a low flow rate to cold-start, and thus may reduce heat loss by heat generation of the fuel cell stack. The thermal management system may use forced convection according to the flow oscillation of the coolant to shorten the cold-start time.

Further, the embodiment of the present disclosure may generate a continuous flow of the coolant during the cold start to prevent a hot spot in the fuel cell stack, and thus may improve durability of the stack.

BRIEF DESCRIPTION OF THE DRAWINGS

A brief description of the drawings will be provided to more sufficiently understand the drawings which are used in the detailed description of the present disclosure.

DETAILED DESCRIPTION

Figure 1:
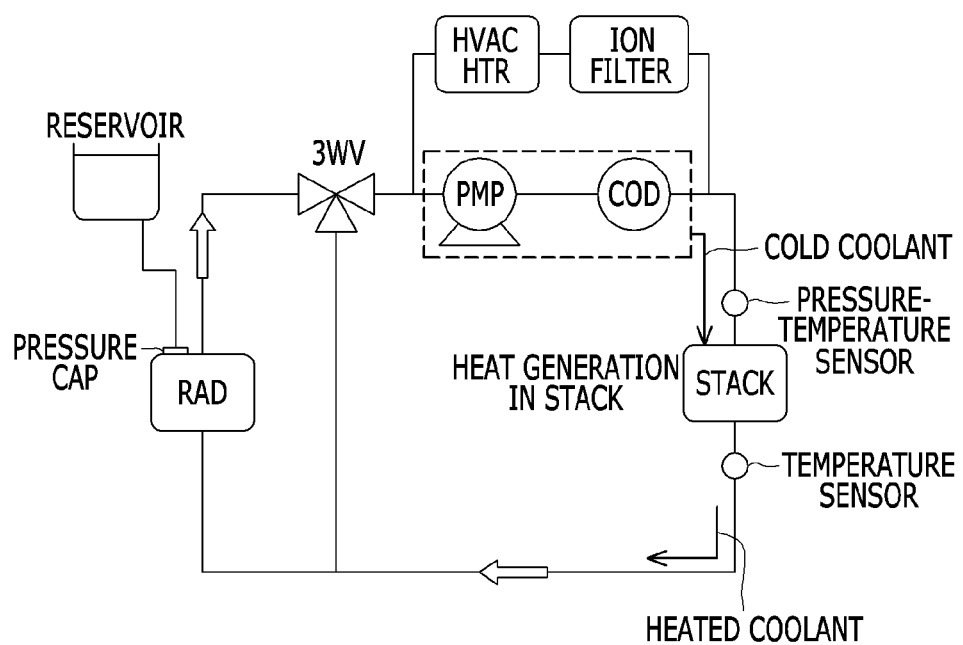
FIG. 1 is a view showing an example of a thermal management system for a fuel cell vehicle.

In order to sufficiently understand the present disclosure and the object achieved by embodying the present disclosure, the accompanying drawings illustrating exemplary embodiments of the present disclosure and contents described in the accompanying drawings are to be referenced.

Hereinafter, the present disclosure will be described in detail by describing exemplary embodiments of the present disclosure with reference to the accompanying drawings. In describing the present disclosure, well-known configurations or functions will not be described in detail since they may unnecessarily obscure the concepts of the present disclosure. Throughout the accompanying drawings, the same reference numerals will be used to denote the same components.

Terms used in the present specification are only used in order to describe specific exemplary embodiments rather than limiting the present disclosure. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary have identical meanings within the context of the related art, and they should not be ideally or excessively formally defined unless the context clearly dictates otherwise.

FIG. 1 is a view showing an example of a thermal management system for a fuel cell vehicle.

Referring to FIG. 1, during a cold-start of the fuel cell vehicle, excess coolant generated by operation of a pump and a cathode-oxygen depletion (COD) heater may undergo heat exchange with a fuel cell stack, and then the coolant heated by the heat exchange may flow from the stack. The heated coolant may be diluted (or cooled) by a coolant outside of the stack. Therefore, heat of the stack may be dispersed (or moved) to the coolant, and because of continuous cooling of the stack, the cold-start in the thermal management system for the fuel cell vehicle may be delayed.

In FIG. 1, RAD indicates a radiator, 3WV indicates a three-way valve, and HVAC HTR indicates a heating, ventilation, and air conditioning (HVAC) heater.

Figure 2:
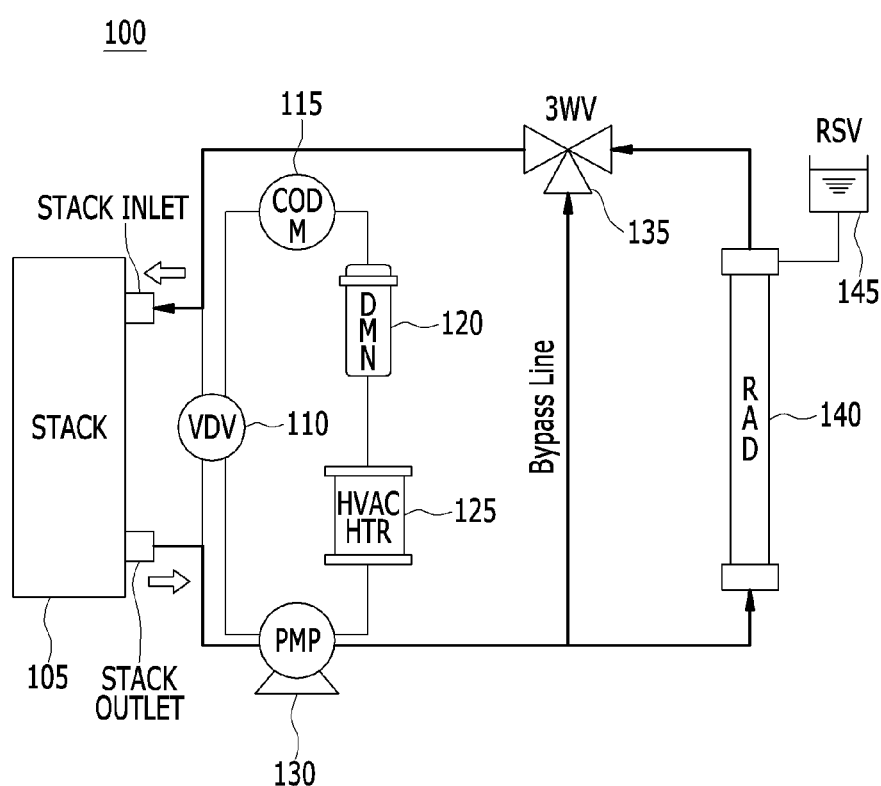
FIG. 2 is a view for explaining a thermal management system (TMS) of a fuel cell vehicle according to an exemplary embodiment of the present disclosure.

FIG. 2 is a view for explaining a thermal management system (TMS) of a fuel cell vehicle according to an exemplary embodiment of the present disclosure.

Referring to FIG. 2, the thermal management system 100 of the fuel cell vehicle may include a variable directional control valve (VDV) (or variable directional valve) 110, a cathode oxygen depletion (COD) heater 115, a deionizer (DMN) (or demineralizer) 120, a heating, ventilation, and air conditioning (HVAC) heater 125, a coolant pump 130, a 3-way valve 135 which determines a flow path through which a coolant flows based on a temperature of the coolant, a radiator 140 and a reservoir 145 to supplement the coolant. In an outlet (or an inlet and the outlet) of a fuel cell stack 105, a temperature sensor (not shown) that detects (or measures) the temperature of the coolant may be disposed. A detection value of the temperature sensor may be provided to a controller that controls the entire operation of the thermal management system 100.

The fuel cell vehicle may have a fuel cell that produces electricity by using a combination of hydrogen and oxygen in air as a power source, instead of a gasoline internal combustion engine using gasoline, may operate an electric motor by using electrical energy generated by the fuel cell, and may be driven by the force of the electric motor.

The thermal management system 100 of the fuel cell vehicle (a fuel cell electric vehicle) may cool the stack 105 to control an operating temperature of the stack 105. The thermal management system 100 may a separate flowline including the COD heater 115 to shorten the cold-start time, and may be a cooling device that changes flow direction of the coolant by using the VDV 110. In more detail, in order to shorten the cold-start time of the fuel cell vehicle, a flow path for oscillation of the coolant may be disposed in the thermal management system 100.

The fuel cell stack 105 may be a hydrogen fuel cell that includes a plurality of unit cells connected in series, and may use an electrochemical reaction between hydrogen supplied from a hydrogen tank (not shown) and oxygen in air supplied from an air blower (not shown) to generate electricity. In another exemplary embodiment of the present disclosure, the fuel cell stack 105 may include a single unit cell.

The VDV 110 may be a hydraulic valve to determine a fluid flow path. The COD heater 115 may rapidly heat the coolant that is a refrigerant.

The deionizer 120, which is a coolant ion filter, may filter (or remove) ions (e.g., metal ions) from the coolant to maintain ion conductivity of the coolant below a certain level.

The HVAC heater 125 may perform heating in the vehicle using the coolant. In another exemplary embodiment of the present disclosure, the HVAC heater 125 may be omitted.

The pump 130 may circulate the coolant through a coolant channel (a coolant line or a coolant pipe) in the stack 105. A flow amount of the coolant may be controlled depending on a rotation speed of the pump 130. Alternatively, a flow rate (or flow amount) of the coolant may be controlled by an opening degree of the VDV 110 or the 3-way valve 135.

The radiator 140 may cool the coolant discharged from the stack 105 after cooling the stack 105 to supply the cooled coolant to the stack 105. The radiator 140 may radiate heat of the coolant through heat exchange with outside air. The radiator 140 may include a radiator fan.

The radiator 140 may be connected to the reservoir 145 through a pressure cap. The pressure cap may be opened by a certain pressure, thereby replenishing a coolant circulation line with the coolant in the reservoir 145 and enabling evaporation coolant that has a high temperature to enter into the reservoir 145.

In a normal time that is not a cold-start time and when a temperature of the coolant is less than or equal to a threshold temperature, as indicated by a bold line in FIG. 2, the pump 130 may operate in a state in which a flow path of the VDV 110 is blocked to form a flow path (e.g., a cooling loop) that passes through a bypass line, the 3-way valve 135, and the stack 105. The bypass line may bypass the coolant so that the coolant does not pass through the radiator 140. During the normal time and when a temperature of the coolant is above the threshold temperature, as indicated by a bold line in FIG. 2, the pump 130 operates in the state in which the flow path of the VDV 110 is blocked to form a flow path (e.g., a cooling loop) that passes through the radiator 140, the 3-way valve 135, and the stack 105. The coolant may flow through the flow path.

Figure 3:
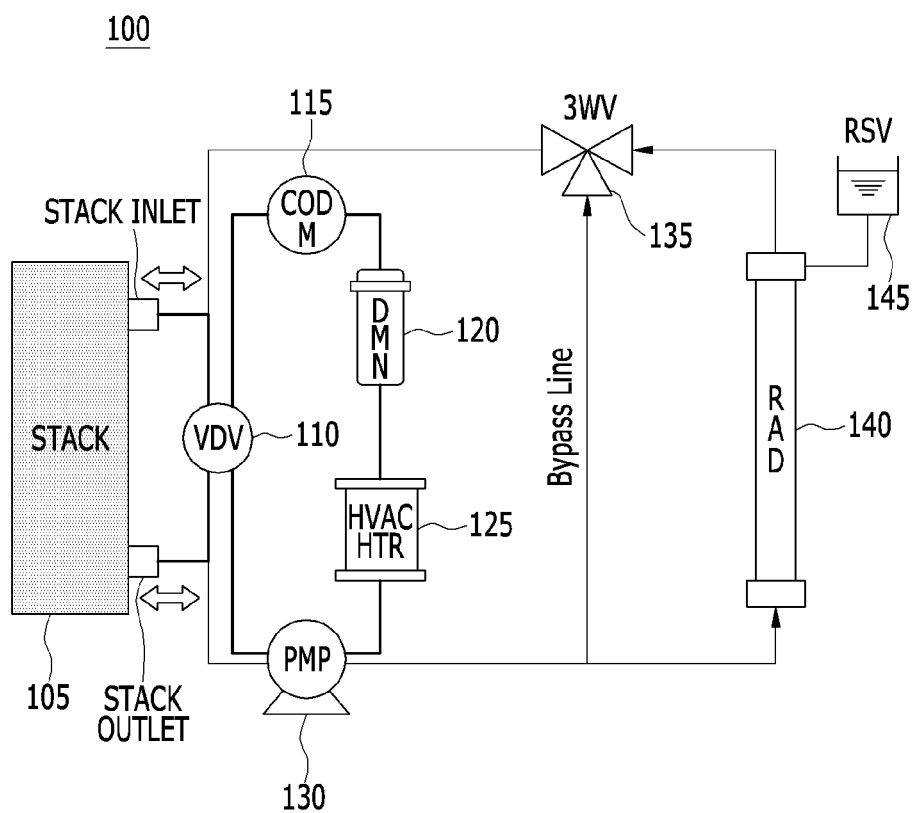
FIG. 3 is a view for explaining another operational example of the TMS shown in FIG. 2.

FIG. 3 is a view for explaining another operation example of the TMS shown in FIG. 2.

FIG. 3 may represent a coolant flow generated during a cold start of the TMS 100.

Referring to FIG. 3, a small amount of the coolant may flow through a flow path (i.e., a cold start loop) that is formed by operations of the VDV 110 and the pump 130, and is shown by a bold line. The cold start loop may cause forced convection in the stack 105. The flow path indicated by the bold line may include the stack 105, the VDV 110, the pump 130, the HVAC heater 125, the DMN 120 and the COD heater 115. Because of a change in direction of a flow path caused by the VDV 110, a flow amount of the coolant that performs heat exchange in the stack 105 and flows from the stack may be reduced. The reduced flow amount may decrease heat loss of the stack 105. Thus, the cold-start time may be shortened.

As the cold start loop unrelated to the cooling loop that includes the bypass line may be used at the cold-start time, the 3-way valve 135 may not need to be controlled.

Figure 4:
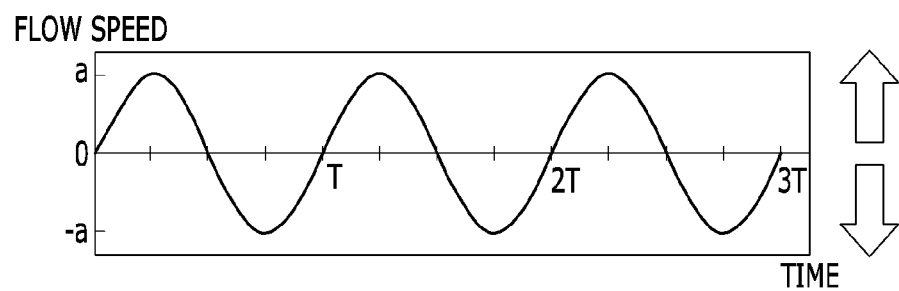
FIG. 4 is a graph describing an oscillating operation of a coolant in a cold start loop.

With reference to FIG. 4, an oscillating operation of the coolant in the coolant channel is described as follows.

The coolant in the stack 105 may be moved by operation of the VDV 110 to be moved with a periodically-changing direction rather than in a one-way direction. When movement of the coolant is normal, a direction of flow speed (or flow velocity) may be continuously changed in a normal direction that is indicated by an arrow in an upward direction and in a reverse direction that is indicated by an arrow in a downward direction, as shown in FIG. 4. In more detail, a coolant flow may be oscillated by operation of the VDV 110 at the inlet (e.g., an entrance) and the outlet (e.g., an exit) of the stack 105.

When the movement direction of the coolant in the stack 105 is periodically changed as explained above, a heated coolant in the stack 105 may not be diluted (or cooled) by a cold coolant outside of the stack 105 and the coolant may be continuously heated. Also, because a heat exchange effect caused by forced convection that is generated due to friction between the stack 105 and the coolant which occurs by the coolant flow may be steadily maintained, the coolant in the stack 105 may be heated and overheating of the stack may be prevented.

Overheating of an internal circuit (i.e., the cold start loop) that is caused by use of the COD heater 115 may be checked by a temperature sensor that is mounted in a housing of the COD heater 115 and may be installed at an inlet or an outlet of the COD heater 115.

An embodiment of the present disclosure may be related to the cold start and may include a cold start loop using a cryogenic coolant. Thus, the cold start loop may not be overheated. If the overheating occurs, operation of the COD heater 115 may be stopped and the speed of the pump 130 may be increased so that the pump may increase a flow amount of the coolant. As a result, the temperature of the COD heater may be lowered. Therefore, overheating of the internal circuit that is caused by use of the COD heater 115 may be prevented (or reduced).

As described above, according to an exemplary embodiment of the present disclosure, two loops may be disposed (or formed) in the front and rear of the pump 130. The embodiment of the present disclosure may include a loop (i.e., the cold start loop) that can change direction of a flow path and may generate forced convection that is oscillated in the coolant channel of the stack 105 during a cold-start.

Figure 5:
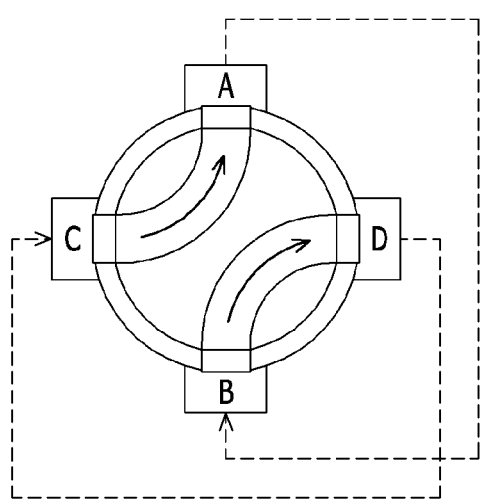
FIG. 5 is a view describing an operation example of a variable directional control valve (VDV).
Figure 6:
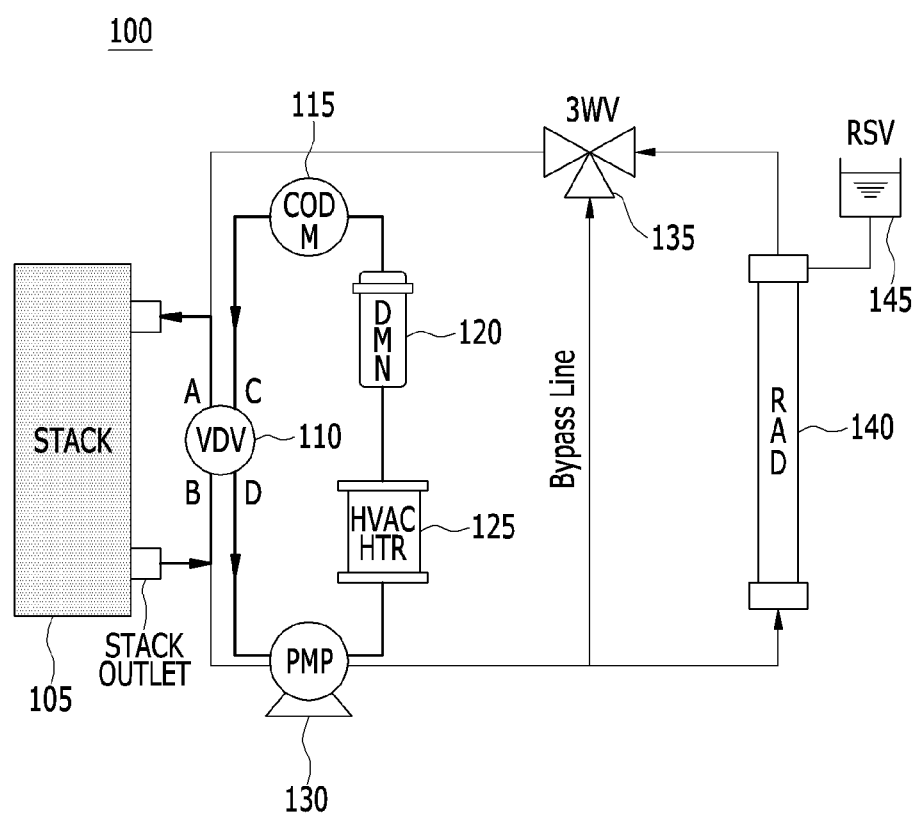
FIG. 6 is a view describing a coolant flow by an operation of the VDV shown in FIG. 5.

FIG. 5 is a view describing an operational example of the variable directional control valve (VDV) shown in FIG. 3. FIG. 6 is a view describing a coolant flow by an operation of the VDV shown in FIG. 5.

Referring to FIGS. 5 and 6, when the pump 130 is driven after the cooling loop that is a main flow path is blocked by using the 3-way valve 135, the coolant may be moved from a fourth port of the VDV 110 that is a D port to a third port (i.e., a C port) of the VDV 110 through the cold start loop that is an ion filter line. The coolant moved to the C port may be moved to a first port (i.e., an A port) of the VDV 110 after the coolant moved to the C port passes through a first internal flow path of the VDV 110 shown in FIG. 5. The coolant moved to the A port may be moved to a second port (i.e., a B port) of the VDV 110 after the coolant moved to the A port moves in a first direction that is a normal direction or a downward direction through the main flow path to heat the stack 105. The coolant moved to the B port may be moved to the front of the pump 130 that is connected to the D port after the coolant moved to the B port passes through a second internal flow path of the VDV 110.

As described above, because a flow of the coolant of a small amount (e.g., about 10 LPM (liters per minute)) in the stack 105 may occur in the normal direction for about 3 seconds, inner heat transfer may be performed smoothly.

Figure 7:
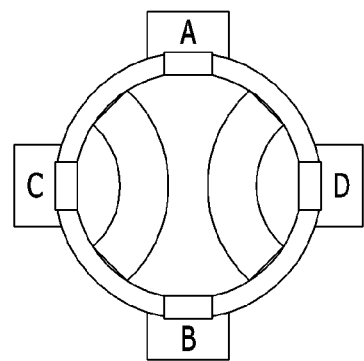
FIG. 7 is a view describing another operational example of the VDV shown in FIG. 3.
Figure 8:
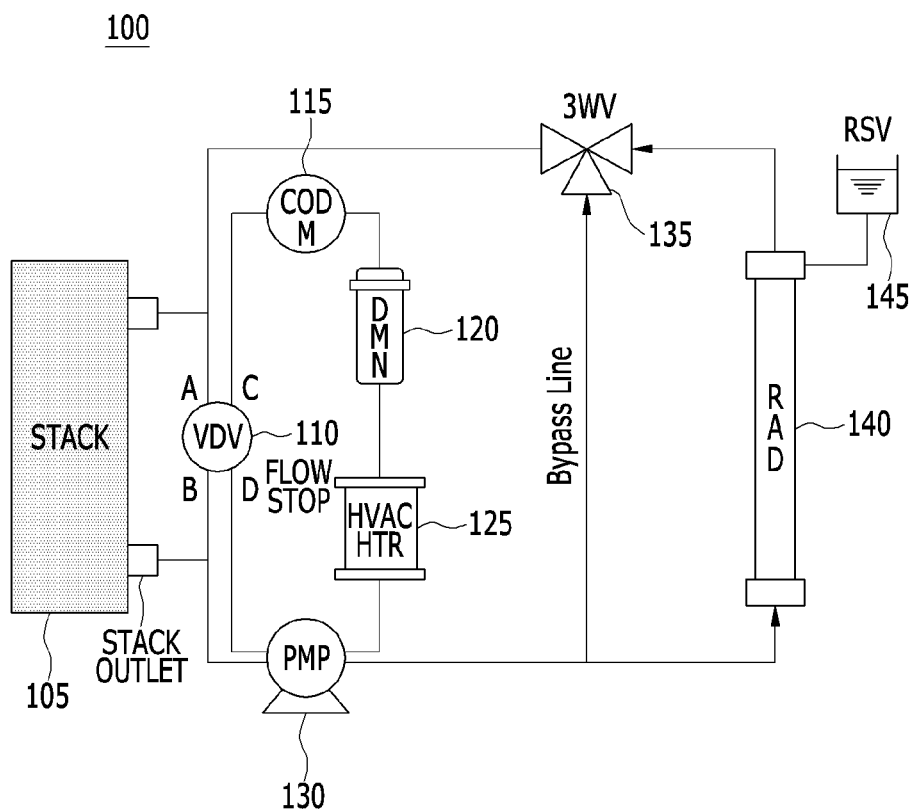
FIG. 8 is a view describing a coolant flow by an operation of the VDV shown in FIG. 7.

FIG. 7 is a view describing another operational example of the VDV shown in FIG. 3. FIG. 8 is a view describing a coolant flow by an operation of the VDV shown in FIG. 7.

Referring to FIGS. 7 and 8, in order to form flow oscillation (or a change in flow direction) of the coolant, a flow stop stage that is a middle step and corresponds to an internal flow path of the VDV 110 which is changed (or rotated) and is shown in FIG. 7 may be disposed, or employed, when a flow of the coolant is changed from the normal direction to the reverse direction. Internal flow paths of the VDV 110 may be rotated by an electric motor capable of rotating a circular disk that includes the internal flow paths.

For example, in order to stop a flow of the coolant for about 1 second, the pump 130 may be stopped and the VDV 110 may be controlled as shown in FIG. 7 so that all flow paths of the VDV 110 may be blocked.

Figure 9:
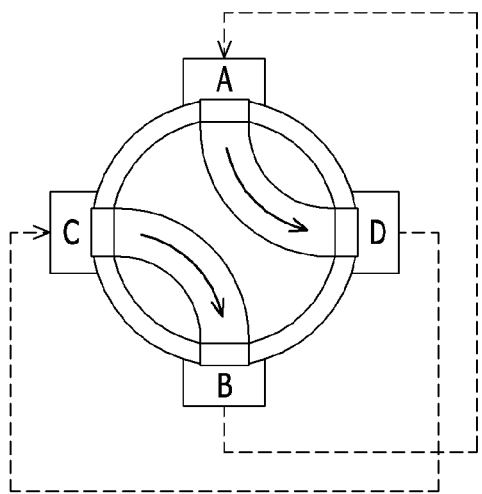
FIG. 9 is a view describing another operational example of the VDV shown in FIG. 3.
Figure 10:
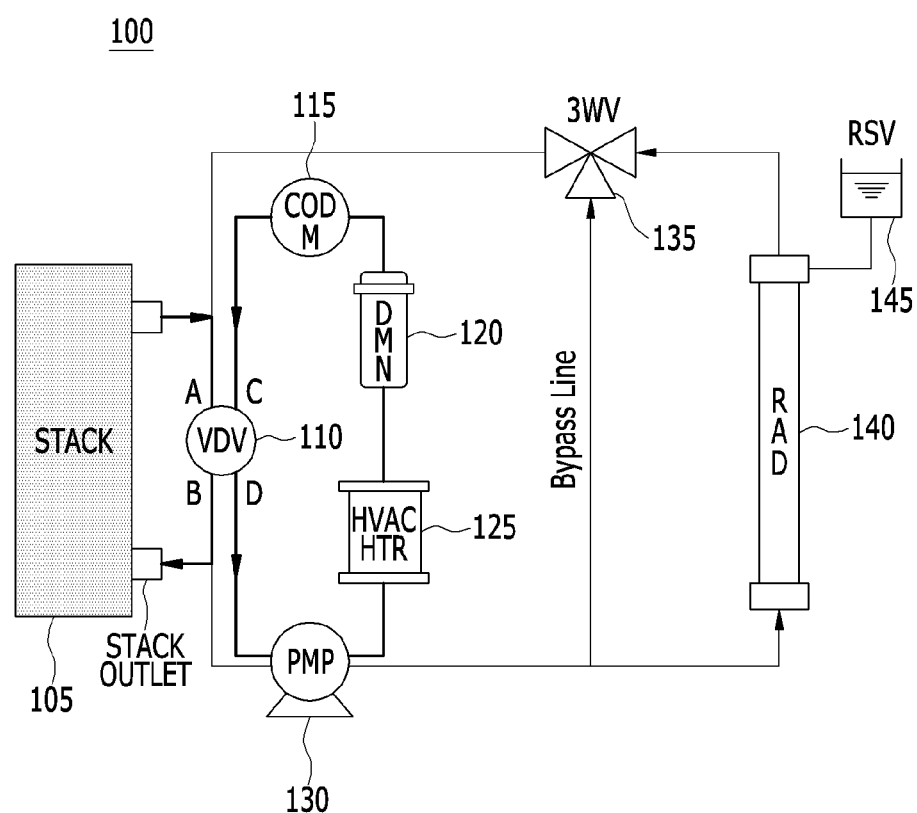
FIG. 10 is a view describing a coolant flow by an operation of the VDV shown in FIG. 9.

FIG. 9 is a view describing another operational example of the VDV shown in FIG. 3. FIG. 10 is a view describing a coolant flow by an operation of the VDV shown in FIG. 9.

Referring to FIGS. 9 and 10, when the pump 130 is driven after the cooling loop that is the main flow path is blocked by using the 3-way valve 135, the coolant may be moved from the D port of the VDV 110 to the C port of the VDV 110 through the cold start loop that is the ion filter line. The coolant moved to the C port may be moved to the B port of the VDV 110 after the coolant moved to the C port passes through the first internal flow path of the VDV 110 shown in FIG. 9. The coolant moved to the B port may be moved to the A port of the VDV 110 after the coolant moved to the B port moves in a second direction that is a reverse direction or an upward direction through the main flow path to heat the stack 105. The coolant moved to the A port may be moved to the front of the pump 130 that is connected to the D port after the coolant moved to the A port passes through the second internal flow path of the VDV 110.

As described above, because a flow of the coolant of a small amount (e.g., about 10 LPM (liters per minute)) in the stack 105 may occur in the reverse direction for about 3 seconds, inner heat transfer may be performed smoothly. Therefore, the amount of the coolant in the stack 105 flowing to outside of the stack 105 may be minimized or reduced, and thus heat loss of the stack 105 may be minimized while internal heat transfer is performed.

Referring to FIGS. 2 through 10, the TMS 100 may include the cold start loop and the cooling loop.

The cold start loop, which may be a heat loop, may heat the coolant that flows through the fuel cell 105 for a cold start of the fuel cell, as indicated by the bold line in FIG. 3. A flow amount (e.g., about 10 LPM (liters per minute)) of the coolant of the cold start loop may be relatively small.

The cooling loop may move the coolant that cools the fuel cell 105, as indicated by the bold line in FIG. 2.

The TMS 100 may further include the VDV 110 which changes the flow direction of the coolant in the cold start loop.

The cold start loop may include the pump 130 which pumps (or circulates) the coolant that flows from the fuel cell 105, the deionizer 120 which filters ions of the coolant that flows from the pump 130 and the heater 115 which heats the coolant that flows from the deionizer 120. In another exemplary embodiment of the present disclosure, the cold start loop may further include the HVAC heater 125.

The VDV 110 may include the first port which is connected to an inlet of the fuel cell 105, the second port which is connected to an outlet of the fuel cell 105, the third port which is connected to the heater 115, the fourth port which is connected to the pump 130, the first internal flow path which rotates to connect the first port and the third port or connect the second port and the third port, and the second internal flow path which rotates to connect the second port and the fourth port or connect the first port and the fourth port.

When the pump 130 is driven, the coolant of the cold start loop may move from the fourth port to the third port through the deionizer 120 and the heater 115, the coolant moved to the third port may move to the first port after the coolant moved to the third port passes through the first internal flow path, the coolant moved to the first port may move to the second port after the coolant moved to the first port moves in the first direction through the flow path included in the cooling loop to heat the fuel cell 105, and the coolant moved to the second port may move to the fourth port after the coolant moved to the second port passes through the second internal flow path. The flow path included in the cooling loop may be a flow path that is formed in the fuel cell 105.

After the coolant of the cold start loop moves to the fourth port, the first internal flow path and the second internal flow path may rotate so that coolant flow of the cold start loop may stop.

When the first internal flow path and the second internal flow path rotate and the pump 130 is driven after the coolant flow of the cold start loop stops, the coolant of the cold start loop may move from the fourth port to the third port through the deionizer 120 and the heater 115, the coolant moved to the third port may move to the second port after the coolant moved to the third port passes through the first internal flow path, the coolant moved to the second port may move to the first port after the coolant moved to the second port moves in a second direction through the flow path included in the cooling loop to heat the fuel cell 105, and the coolant moved to the first port may move to the fourth port after the coolant moved to the first port passes through the second internal flow path.

The cooling loop may include the pump 130 which pumps the coolant that flows from the fuel cell 105 and the radiator 140 which cools the coolant flowing from the pump 130. The cooling loop may further include the 3-way valve 135 which selects between the coolant flowing from the pump 130 and a coolant flowing from the radiator to provide the selected coolant to the fuel cell 105.

The TMS 100 may further include the controller (or a control unit) that controls an entire operation of elements such as the VDV 110, the COD heater 115, the pump 130, the 3-way valve 135 the radiator 140, etc. The controller may control an opening operation or a closing operation of the VDV 110. For example, the controller may be one or more microprocessors operated by a program or hardware including the microprocessor. The program may include a series of commands for executing a method of thermal management of the fuel cell vehicle according to an exemplary embodiment of the present disclosure.

The components, "~unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present disclosure and are not used for qualifying the meaning or limiting the scope of the present disclosure, which is disclosed in the appended claims. Therefore, it will be understood by those skilled in the art that various modifications and equivalent exemplary embodiments are possible from the present disclosure. Accordingly, the actual technical protection scope of the present disclosure must be determined by the spirit of the appended claims.

What is claimed is:

1. A thermal management system of a fuel cell vehicle, comprising:
   a cold start loop which heats a coolant that flows through a fuel cell during a cold start of the fuel cell;
   a cooling loop which moves a coolant that cools the fuel cell, and
   a variable directional control valve which changes a flow direction of the coolant in the cold start loop,
   wherein the cold start loop comprises:
   a pump which pumps a coolant that flows from the fuel cell;
   a deionizer which filters ions of a coolant that flows from the pump; and
   a heater which heats a coolant that flows from the deionizer, and
   wherein the variable directional control valve comprises:
   a first port which is connected to an inlet of the fuel cell;
   a second port which is connected to an outlet of the fuel cell;
   a third port which is connected to the heater;
   a fourth port which is connected to the pump;
   a first internal flow path which rotates to connect the first port and the third port or to connect the second port and the third port; and
   a second internal flow path which rotates to connect the second port and the fourth port or to connect the first port and the fourth port.

2. The thermal management system of claim 1, wherein the cooling loop comprises:
   a pump which pumps a coolant that flows from the fuel cell; and
   a radiator which cools a coolant flowing from the pump.

3. The thermal management system of claim 2, wherein the cooling loop further comprises a 3-way valve which selects from the coolant flowing from the pump and a coolant flowing from the radiator to provide the selected coolant to the fuel cell.

4. The thermal management system of claim 1, wherein the thermal management system further comprises a controller which controls an operation of the variable directional control valve.

5. The thermal management system of claim 1, wherein, when the pump is driven, the coolant of the cold start loop moves from the fourth port to the third port through the deionizer and the heater, the coolant moved to the third port moves to the first port after the coolant moved to the third port passes through the first internal flow path, the coolant moved to the first port moves to the second port after the coolant moved to the first port moves in a first direction through a flow path included in the cooling loop to heat the fuel cell, and the coolant moved to the second port moves to the fourth port after the coolant moved to the second port passes through the second internal flow path.

6. The thermal management system of claim 5, wherein, after the coolant of the cold start loop moves to the fourth port, the first internal flow path and the second internal flow path rotate so that a coolant flow of the cold start loop stops.

7. The thermal management system of claim 6, wherein, when the first internal flow path and the second internal flow path rotate and the pump is driven after the coolant flow of the cold start loop stops, the coolant of the cold start loop moves from the fourth port to the third port through the deionizer and the heater, the coolant moved to the third port moves to the second port after the coolant moved to the third port passes through the first internal flow path, the coolant moved to the second port moves to the first port after the coolant moved to the second port moves in a second direction through the flow path included in the cooling loop to heat the fuel cell, and the coolant moved to the first port moves to the fourth port after the coolant moved to the first port passes through the second internal flow path.

8. The thermal management system of claim 1, wherein a flow amount of the coolant of the cold start loop is smaller than 11 liters per minute.

* * * * *